US012552171B2

(12) United States Patent
Matsumoto

(10) Patent No.: US 12,552,171 B2
(45) Date of Patent: Feb. 17, 2026

(54) PRINTER

(71) Applicant: Kazuyoshi Matsumoto, Tokyo (JP)

(72) Inventor: Kazuyoshi Matsumoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 178 days.

(21) Appl. No.: 18/607,655

(22) Filed: Mar. 18, 2024

(65) Prior Publication Data

US 2024/0326450 A1 Oct. 3, 2024

(30) Foreign Application Priority Data

Mar. 27, 2023 (JP) ................................ 2023-049357

(51) Int. Cl.
*B41J 2/175* (2006.01)
*B41J 2/21* (2006.01)
*B41J 25/00* (2006.01)

(52) U.S. Cl.
CPC ............ *B41J 2/175* (2013.01); *B41J 2/2103* (2013.01); *B41J 2/2117* (2013.01); *B41J 25/001* (2013.01)

(58) Field of Classification Search
CPC ........ B41J 2/175; B41J 2/2103; B41J 2/2117; B41J 25/001
USPC ........................................................... 347/37
See application file for complete search history.

(56) References Cited

U.S. PATENT DOCUMENTS 6,478,403 B1 * 11/2002 Giles ........................ B41J 19/14 400/283
2009/0091596 A1 * 4/2009 Askeland ............. B41J 2/16588 347/22
2015/0091971 A1 4/2015 Matsumoto et al.
2016/0205787 A1 * 7/2016 Gothait .................. B41J 25/001 118/696
2017/0320316 A1 11/2017 Nakamura et al.
2017/0320339 A1 11/2017 Matsumoto et al.
2018/0217536 A1 8/2018 Obata et al.
2020/0047527 A1 * 2/2020 Rosenboom ........... B41J 19/142
2020/0101769 A1 4/2020 Kunioka et al.
2020/0298591 A1 9/2020 Ueno et al.
2021/0237467 A1 8/2021 Kemma et al.
2022/0305796 A1 9/2022 Takahashi et al.
2022/0305797 A1 9/2022 Takahashi et al.
2023/0202180 A1 6/2023 Matsumoto et al.

FOREIGN PATENT DOCUMENTS

JP 2016-153183 A 8/2016
JP 2021-017879 A 2/2021

* cited by examiner

*Primary Examiner* — Jason S Uhlenhake
*Assistant Examiner* — Alexander D Shenderov
(74) *Attorney, Agent, or Firm* — XSENSUS LLP

(57) ABSTRACT

A printer includes multiple heads to discharge liquids; a sub-carriage mounting the multiple heads; a carriage movable in a moving direction and detachably mounting the sub-carriage; a liquid container containing the liquids supplied to the multiple heads; a temporary stand on the carriage to temporarily hold the sub-carriage; and a branch having multiple branch paths to distribute the liquids from the liquid container to the multiple heads. The branch and the temporary stand are disposed at a first side of the carriage in the moving direction. The sub-carriage is disposed at a second side opposite to the first side of the carriage in the moving direction.

6 Claims, 15 Drawing Sheets

COMPARATIVE EXAMPLE

PRINTER

CROSS-REFERENCE TO RELATED APPLICATION

This patent application is based on and claims priority pursuant to 35 U.S.C. § 119 (a) to Japanese Patent Application No. 2023-049357, filed on Mar. 27, 2023, in the Japan Patent Office, the entire disclosure of which is hereby incorporated by reference herein.

BACKGROUND

Technical Field

Embodiments of the present disclosure relate to a printer.

Related Art

In printing devices that discharge liquid to perform printing, it is known that, for example, when printing on fabric, a preliminary base treatment with a white liquid is conducted, followed by the printing of the desired image using colored liquid.

In typical devices that use white ink, it is known that white ink supplied from a liquid reservoir is divided into multiple paths and then delivered to the head unit.

However, when using liquids that easily reduce fluidity, such as those with sedimentation properties like white liquids, it is preferable to have shorter liquid paths.

SUMMARY

An embodiment of the present disclosure provides a printer including multiple heads to discharge liquids; a sub-carriage mounting the multiple heads; a carriage movable in a moving direction and detachably mounting the sub-carriage; a liquid container containing the liquids supplied to the multiple heads; a temporary stand on the carriage to temporarily hold the sub-carriage; and a branch having multiple branch paths to distribute the liquids from the liquid container to the multiple heads. The branch and the temporary stand are disposed at a first side of the carriage in the moving direction. The sub-carriage is disposed at a second side opposite to the first side of the carriage in the moving direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
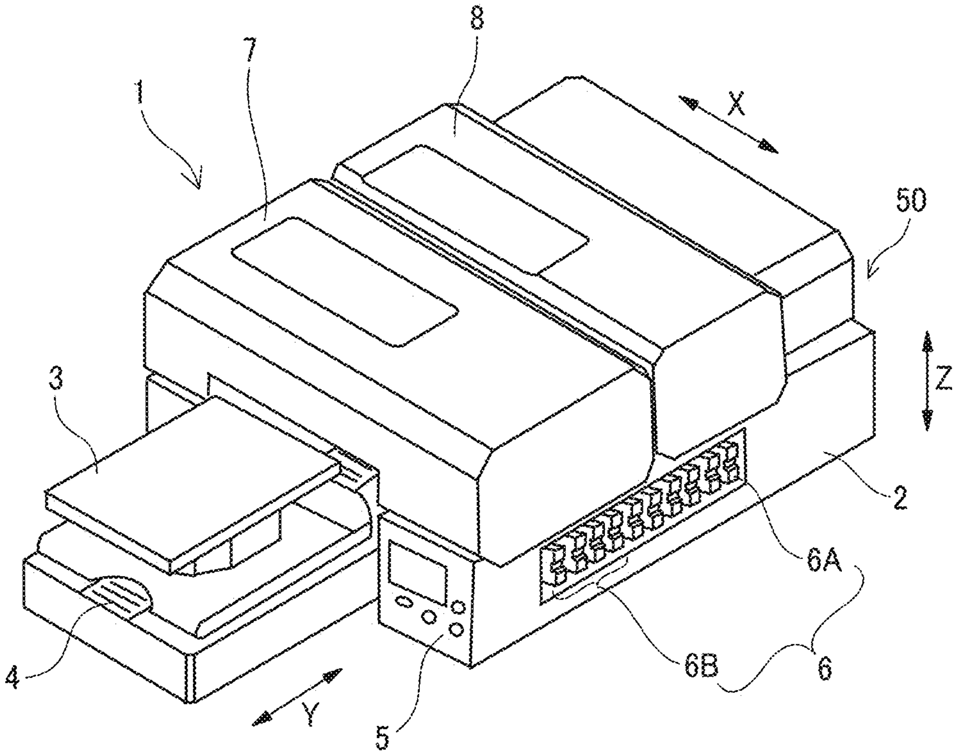
FIG. 1 is a perspective view of a printer as a liquid discharge apparatus with its covers closed, according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

According to one aspect of the present disclosure, it is possible to shorten the liquid path.

Figure 2:
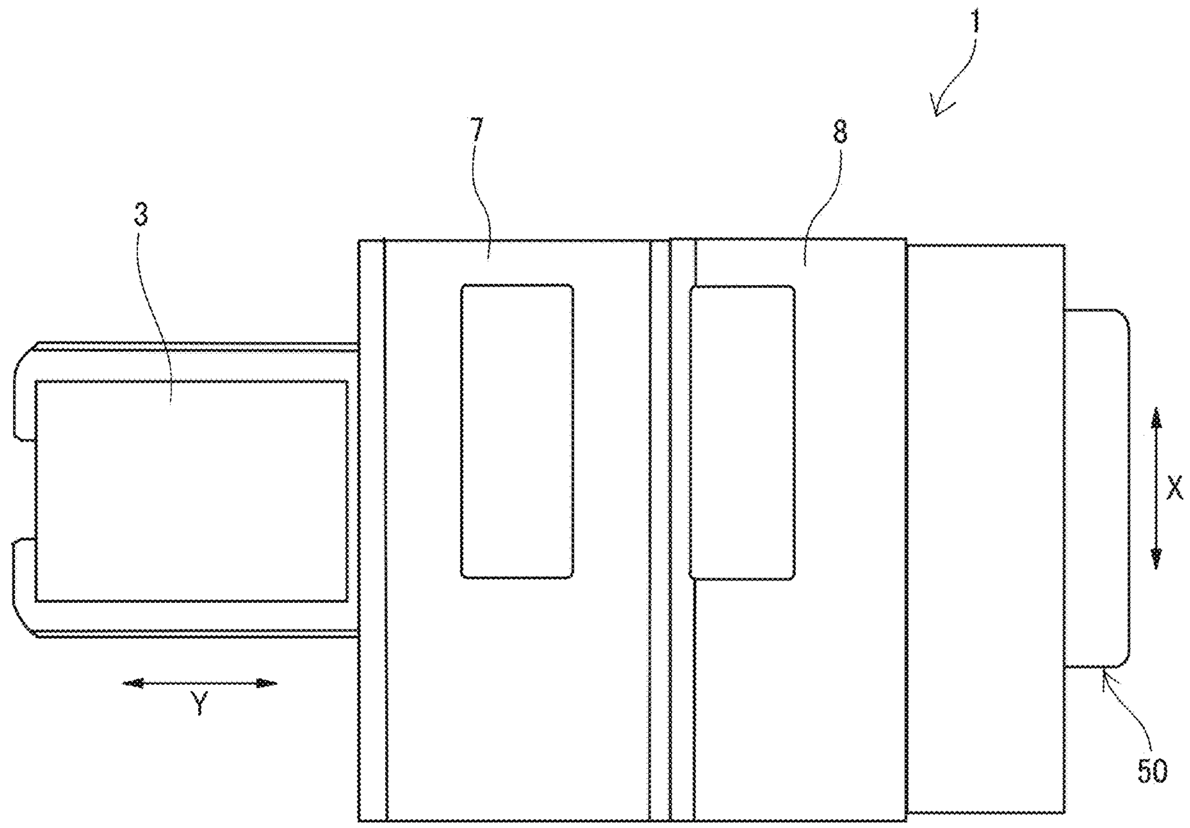
FIG. 2 is a plan view of the printer of FIG. 1 with the covers closed.
Figure 3:
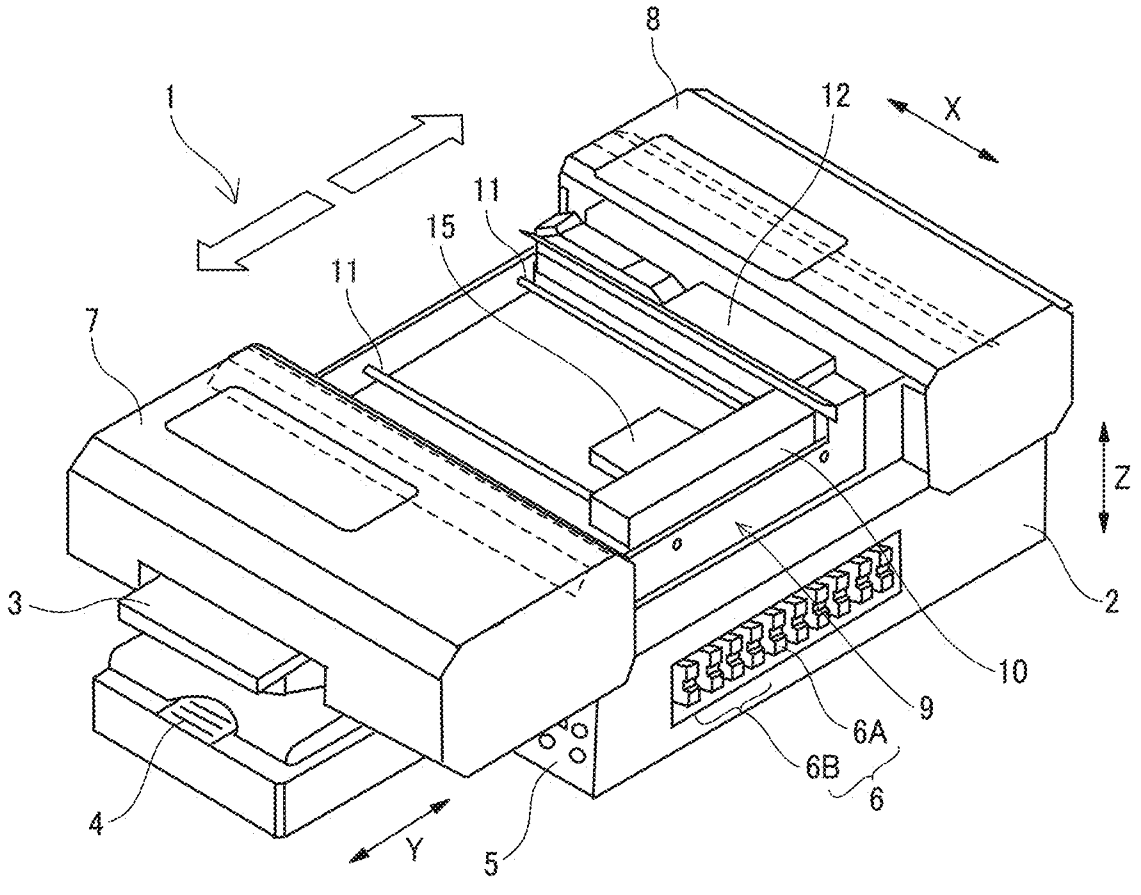
FIG. 3 is a perspective view of the printer of FIG. 1 with the covers open.
Figure 4:
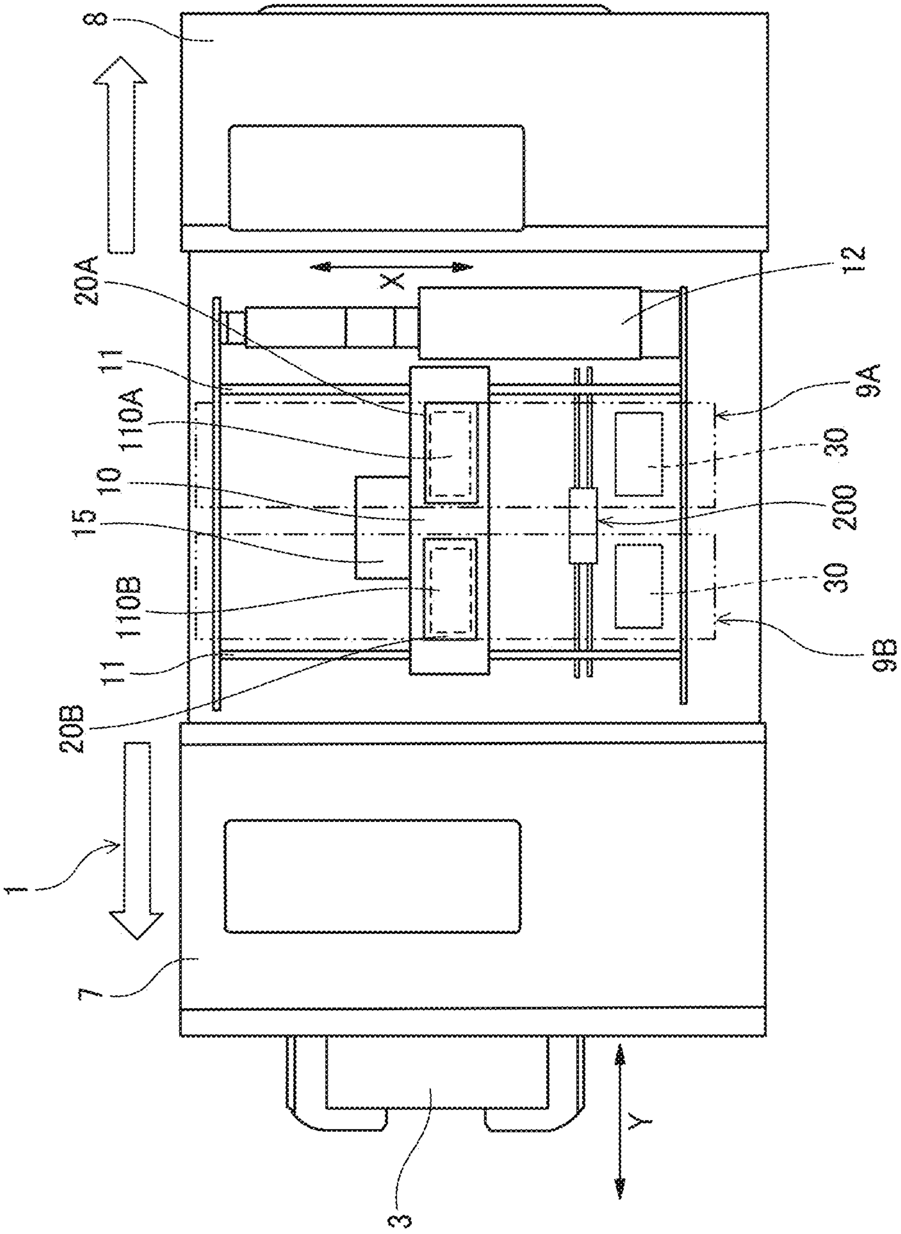
FIG. 4 is a plan view of the printer of FIG. 1 with the covers open.

Embodiments of the present disclosure are described below referring to the accompanying drawings. A printer as a liquid discharge apparatus according to a first embodiment of the present disclosure is described referring to FIGS. 1 to 4. FIG. 1 is a perspective view of the printer with covers closed. FIG. 2 is a plan view of the printer with the covers closed. FIG. 3 is a perspective view of the printer with the covers open. FIG. 4 is a plan view of the printer with the covers open.

In the present embodiment, a direction (main scanning direction) X in FIG. 1 is a transverse direction of the printer and a moving direction of a head, a direction (sub-scanning direction orthogonal to the main scanning direction) Y is a front-rear direction of the printer and a medium conveyance direction, and a direction Z is a vertical direction. The direction X and the direction Y are parallel to a surface, onto which liquid is discharged, of a medium on a stage, but may have some error. The directions X, Y, and Z are orthogonal to each other.

A printer 1 according to the present embodiment includes a stage 3 that is movable in the direction Y in a housing 2. The stage 3 is mounted on a guide rail 4 extending in the direction Y. An operation panel 5 is disposed on a front face of the housing 2. Multiple liquid tanks 6, which are liquid containers containing liquids supplied to the heads, are detachably mounted on the side surface of the housing 2. A front cover 7 and a rear cover 8 as covers are disposed over the housing 2.

The multiple liquid tanks 6 include white ink tanks 6A and multiple color ink tanks 6B. The white ink tanks 6A are liquid tanks (or liquid cartridges) that contain a white (W) liquid (or white ink). The color ink tanks 6B serve as liquid tanks (or liquid cartridges) that contain the color liquids (or color inks) for cyan (C), magenta (M), yellow (Y), and black (K), each in separate compartments. In the present embodiment, the black ink is considered one of the color inks.

The stage 3 has a flat upper face on which the medium is placed. The upper face of the stage 3 is parallel to the direction X and the direction Y. The stage 3 moves on the guide rail 4 to reciprocate in the direction Y (both the front direction and the rear direction). The stage 3 is movable up and down in the direction Z to adjust the height of the medium placed on the stage 3.

The front cover 7 and the rear cover 8 are movable in the direction Y (both the front direction and the rear direction). In FIG. 1, the front cover 7 has been moved backward and the rear cover 8 has been moved forward to close the front cover 7 and the rear cover 8. On the other hand, in FIG. 3, the front cover 7 has been moved forward and the rear cover 8 has been moved backward to open the front cover 7 and the rear cover 8.

As described above, the front cover 7 and the rear cover 8 are slidably opened and closed. As a result, an occupied space of the printer 1 including an opening and closing space of the front cover 7 and the rear cover 8 can be reduced as compared with a configuration in which a front cover and a rear cover are opened and closed, for example, in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

An apparatus body 50 of the printer 1 includes the housing 2 and two liquid discharge units 9 (9A and 9B) provided on the housing 2. In the present embodiment, in particular, the apparatus body 50 is a portion of the printer 1 except the front cover 7 and the rear cover 8. The front cover 7 and the rear cover 8 are slidable in the direction Y relative to the apparatus body 50.

When the front cover 7 and the rear cover 8 are opened, the liquid discharge units 9 in the printer 1 are open to the outside. Since the liquid discharge units 9 are open to the outside, a head maintenance device 30, a head, and the periphery of the head can be cleaned, or a carriage can be replaced.

The front cover 7 and the rear cover 8 are closed during image formation. Thus, the liquid discharge units 9B and 9A are covered with the front cover 7 or the rear cover 8. Operating units such as a carriage of the liquid discharge units 9A and 9B are no longer accessible from the outside.

Since the liquid discharge units 9B and 9A are disposed in a space closed with the front cover 7 or the rear cover 8, the mist can be prevented from being scattered to the surrounding area during a liquid discharge operation, an airflow can be circulated in the space closed with the front cover 7 or the rear cover 8 by fans provided in the liquid discharge units 9B and 9A, and the generated mist can be circulated and collected in the space closed with the front cover 7 or the rear cover 8.

The printer 1 of the present embodiment includes the two liquid discharge units 9A and 9B disposed in the direction Y. The liquid discharge unit 9A discharges a white ink. The liquid discharge unit 9B discharges, for example, color inks for Y, M, C, and K. The liquids discharged by the liquid discharge units 9A and 9B are not limited to the above-described liquids, and any one of a color ink, a white ink, and a pretreatment liquid may be discharged. Particularly for cloth media, it is preferable to apply a pretreatment liquid before forming images with ink. Preferably, one of the liquid discharge units is provided with a head that discharges the pretreatment liquid.

The liquid discharge units 9A and 9B share a carriage 10, a guide rod 11, and an electrical portion 12 including a substrate and an electrical cover.

The guide rod 11 extends in the direction X. The carriage 10 is movable in the direction X along the guide rod 11. The carriage 10 is mounted with a first sub-carriage 20A, which carries a first head 110A that makes up the liquid discharge unit 9A, and a second sub-carriage 20B, which carries a second head 110B that makes up the liquid discharge unit 9B, both of which are detachably mounted. In the following description, the term "sub-carriage 20" refers to either the first sub-carriage 20A, the second sub-carriage 20B, or both.

The carriage 10 includes a temporary stand 15 for temporarily holding the first sub-carriage 20A or the second sub-carriage 20B when they are detached from the carriage 10 for the maintenance or replacement of the first head 110A or the second head 110B.

Head maintenance devices 30 that perform maintenance on the first head 110A of the liquid discharge unit 9A and the second head 110B of the liquid discharge unit 9B are provided outside a liquid discharge area, on one side in a left-right direction. A wiping device 200 shared by the first head 110A and the second head 110B is provided outside the liquid discharge area, on the side of the head maintenance devices 30.

An outline of an image forming process on a medium by the liquid discharge units 9 is described below.

A medium is placed on the stage 3. The stage 3 is moved along the guide rail 4 and is conveyed to the rear side of the printer 1. The pretreatment liquid is applied to the medium by the liquid discharge unit 9A. Specifically, the pretreatment liquid is applied to the medium in the direction X from a certain head of the first head 110A while the carriage 10 is moved in the direction X along the guide rod 11. By repeating this process at each position in the direction Y, the white ink is applied to the medium.

Then, stage 3 is moved forward in the Y direction, and in a similar manner, inks of colors, including black, are discharged onto the medium by the second head 110B of the liquid discharge unit 9B. Thus, an image can be formed on the medium.

Figure 5:
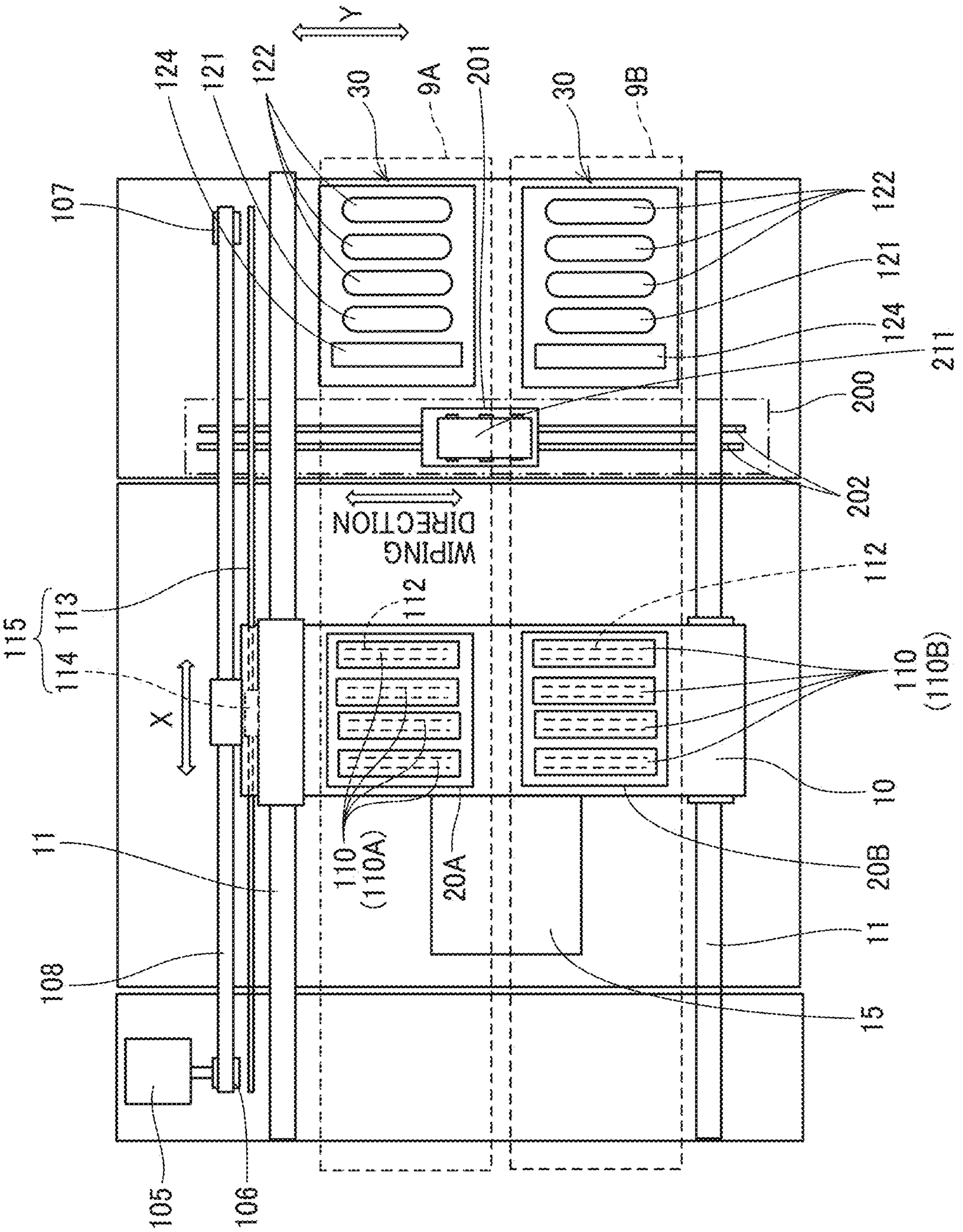
FIG. 5 is a plan view of liquid discharge units according to an embodiment of the present disclosure.

An example of the liquid discharge units of the printer according to the present embodiment is described below referring to FIG. 5. FIG. 5 is a plan view of the liquid discharge units.

As described above, the liquid discharge units 9 (9A and 9B) share the carriage 10 that is held by two guide rods 11 bridged between left and right side plates so as to reciprocate in the main scanning direction X. The carriage 10 is reciprocated in the main scanning direction X by a main scanning motor 105 via a timing belt 108 looped around a driving pulley 106 and a driven pulley 107.

The carriage 10 is mounted with a first sub-carriage 20A, which carries a first head 110A that makes up the liquid discharge unit 9A, and a second sub-carriage 20B, which carries a second head 110B that makes up the liquid discharge unit 9B, both of which are detachably mounted at different positions in the sub-scanning direction Y.

The first head 110A and the second head 110B each include four liquid discharge heads (hereinafter, simply referred to as "heads") 110 serving as liquid discharge portions. The heads 110 each have, for example, a plurality of discharge port arrays (nozzle arrays) each having a plurality of discharge ports (nozzles) 112 through which liquid is discharged.

An encoder scale 113 having a predetermined pattern is bridged between both side plates in the main scanning direction X. The carriage 10 is provided with an encoder sensor 114 including a transmissive photosensor that reads the pattern of the encoder scale 113. The encoder scale 113 and the encoder sensor 114 define a linear encoder (main scanning encoder) 115 that detects the movement of the carriage 10.

The head maintenance devices 30 serving as a maintenance and recovery mechanism that maintains and recovers the heads 110 of the first head 110A and the second head 110B are disposed on one side in the main scanning direction X of the carriage 10.

The head maintenance devices 30 each include, for example, a suction cap 121, three moisturizing caps 122, and an idle discharge receiver 124. The suction cap 121 also serves as one moisturizing cap. The suction cap 121 and the moisturizing caps 122 cap nozzle faces 111 (faces having nozzles) of the heads 110. The wiping device 200, which wipes the heads 110, is disposed to extend over the two liquid discharge units 9A and 9B.

The wiping device 200 includes a web tank 201, a guide rail 202, and a drive mechanism. The web tank 201 includes a web 211 made of cloth or nonwoven fabric. The guide rail 202 guides the movement of the web tank 201 in a wiping direction. The drive mechanism moves the web tank 201 in the wiping direction. The web tank 201 may be mounted on the guide rail 202 via a tank holder, or may be directly mounted on the guide rail 202.

In the printer 1, when printing is performed on a fabric, the stage 3 is moved out of the apparatus body 50. When a fabric is placed on the stage 3 and a print start is instructed, the stage 3 is retracted into the apparatus body 50. Intermittent movement of the stage 3 in the sub-scanning direction Y, movement of the carriage 10 in the main scanning direction X, and discharge of liquid of a certain color from a head 110 onto the stopped fabric are repeated to print a certain image on the fabric.

To maintain and recover the head 110, the head 110 is moved to a position above the web tank 201, and the web tank 201 is moved in the wiping direction (the same as the direction Y) while the web 211 is in contact with the nozzle face of the head 110. Thus, contaminations such as residual liquid, a thickened or fixed object of the liquid, and dust adhering to the nozzle face of the head 110 are wiped off.

Figure 6:
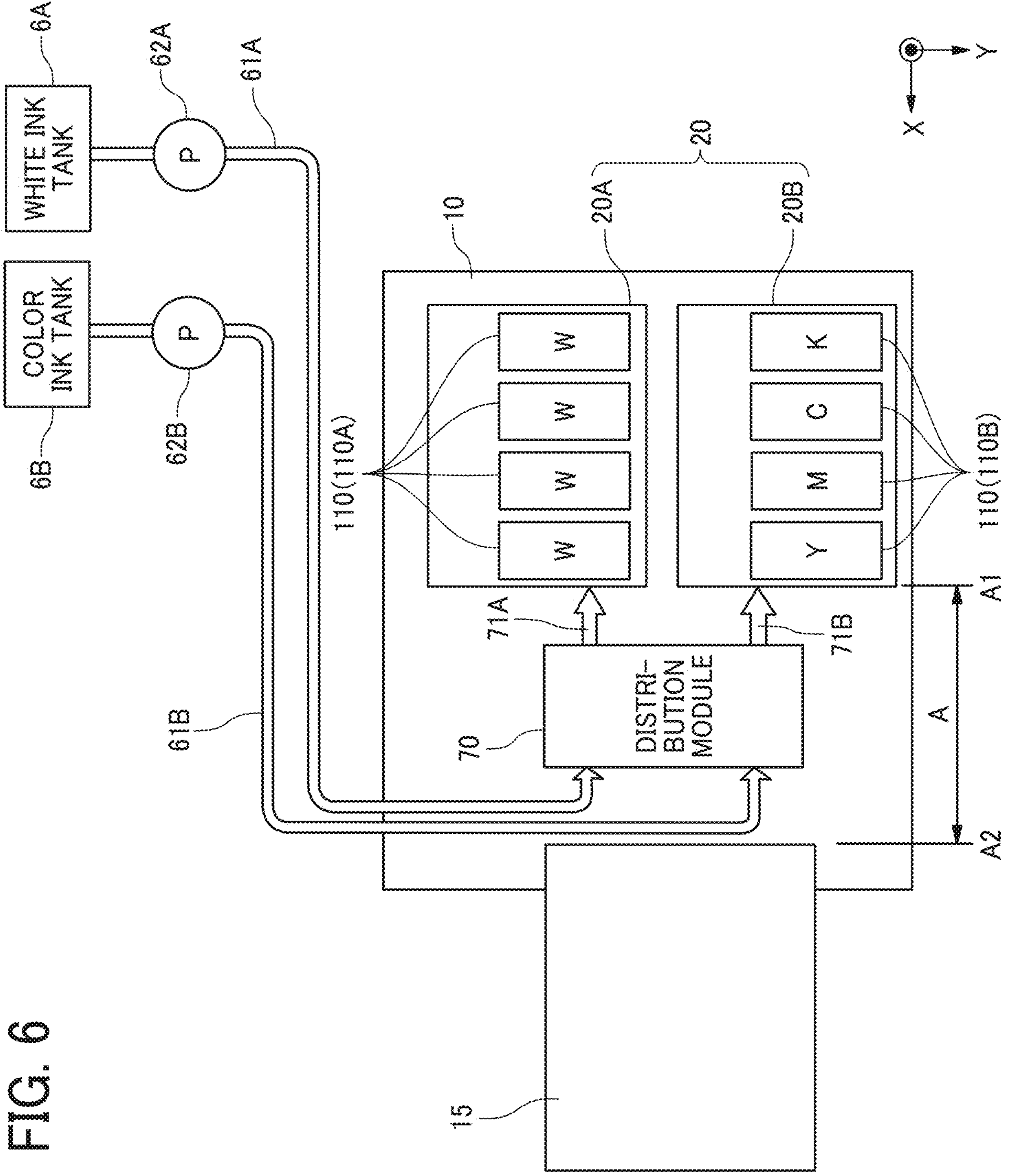
FIG. 6 is a diagram of a liquid supply system according to a first embodiment of the present disclosure.

A liquid supply system according to the first embodiment of the present disclosure is described below with reference to FIG. 6. FIG. 6 is a diagram of a liquid supply system according to the first embodiment of the present disclosure.

The white ink tank 6A is a liquid tank that contains white ink supplied to each of the heads 110 of the first heads 110A. The white ink tank 6A is connected to a branching module 70 (or a distribution module in FIG. 6), which is a branching mechanism or a branch installed on the carriage 10, through the liquid path 61A. A liquid feed pump 62A, which is a liquid feeder, is disposed in the liquid path 61A.

The color ink tank 6A is a liquid tank that contains color inks of Y, M, C, K supplied to each of the heads 110 of the second heads 110B. The color ink tank 6B is connected to the branching module 70, which is a branching mechanism (or a branch) installed on the carriage 10, through a liquid path 61B. A liquid feed pump 62B, which is a liquid feeder, is disposed in the liquid path 61B.

The branching module 70 supplies white ink to each of the first heads 110A on the first sub-carriage 20A through the liquid path 71A. The branching module 70 supplies the YMCK color inks to the color heads 110 of the second heads 110B on the second sub-carriage 20B through the liquid path 71B. The liquid paths 71A and 71B are formed of, for example, a flexible tube.

In other words, the branch (e.g., the branching module) has multiple branch paths (e.g., the liquid path 71A and the liquid path 71B) to divide and supply the liquids from the liquid container (e.g., the liquid tank 6) to the multiple heads.

The branching module 70 is positioned on the same side as the temporary stand 15, relative to the sub-carriage 20 (e.g., the first sub-carriage 20A and the second sub-carriage 20B), in the main scanning direction X, which is the moving direction of the carriage 10. In the present embodiment, the branching module 70 is located between the mounting position at which the sub-carriage 20 is mounted on the carriage 10 and the temporary stand 15 in a plan view. In other words, the branch (branching module 70) and the temporary stand 15 are disposed at the first side (left side in FIG. 6) of the carriage 10 in the moving direction (X direction in FIG. 6) of the carriage 10, and the sub-carriage 20 is disposed at the second side (right side in FIG. 6) opposite to the first side of the carriage 10 in the moving direction (X direction in FIG. 6) of the carriage 10.

More specifically, the mounting position of the sub-carriage 20 on the carriage 10 is as illustrated in FIG. 6. The position A1 refers to one end of the mounting position in the main scanning direction X, which is closer to the temporary stand 15. In addition, the position A2 refers to one end of the temporary stand 15 in the main scanning direction X, which is closer to the sub-carriage 20. In FIG. 6, the branching module 70 is located within a region A between the position A1 and the position A2 in the main scanning direction X.

Figure 7:
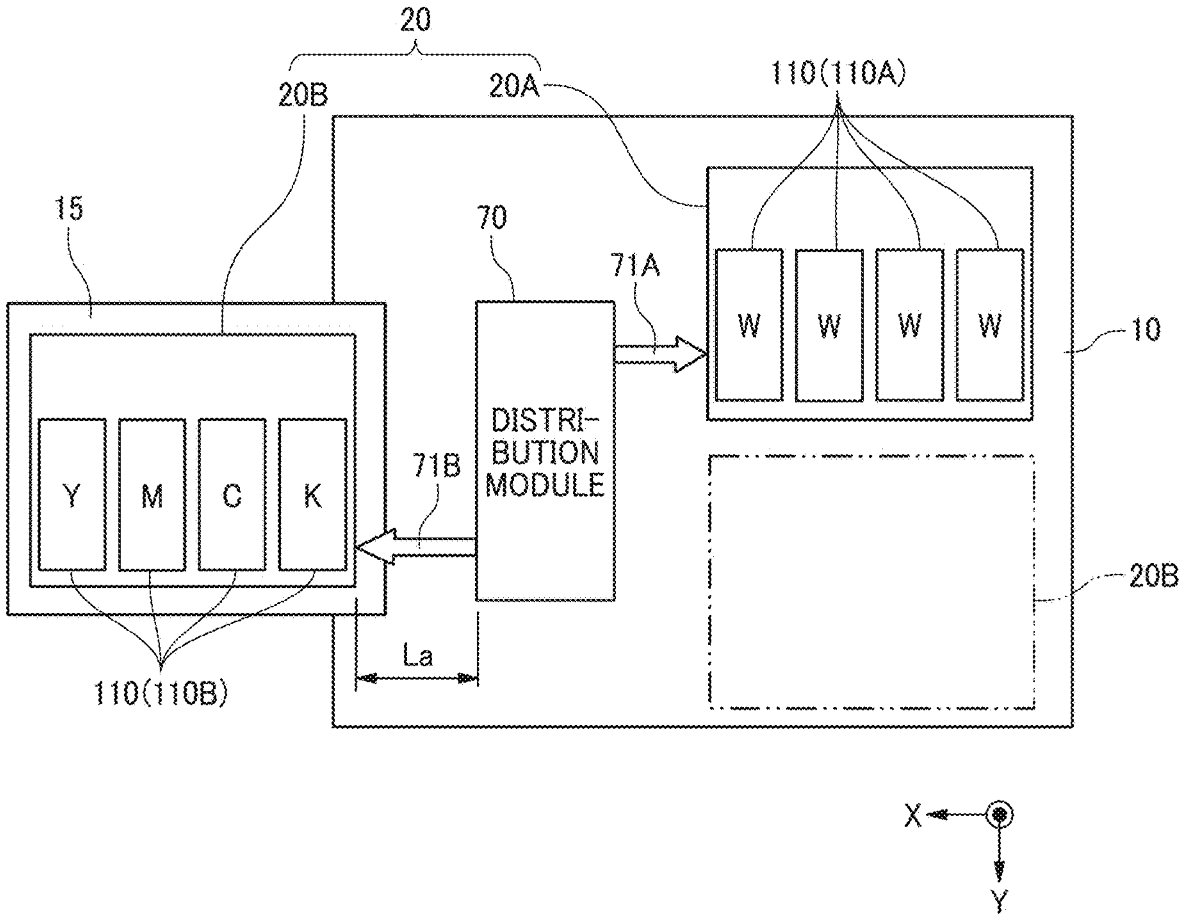
FIG. 7 is a plan view of a second sub-carriage placed on a temporary stand, for describing the operation of the first embodiment.

The operation of the present embodiment is described with reference to FIG. 7. FIG. 7 is a plan view of a second sub-carriage placed on the temporary stand for describing its operation, according to the present embodiment.

In this case, for example, the second sub-carriage 20B is removed from the carriage 10 and temporarily placed on the temporary stand 15 for maintenance and replacement of the second head 110B for color ink.

In this situation, the branching module 70 (or the distribution module in FIG. 7) is located on the same side as the temporary stand 15 with respect to the sub-carriage 20 in the main scanning direction X, which is the moving direction of the carriage 10.

The interval La, or the distance, is provided between the branching module 70 and the second sub-carriage 20B on the temporary stand 15. In other words, the liquid path 71B, which connects the branching module 70 to the second sub-carriage 20B, has a straight-line length of La.

Figure 8:
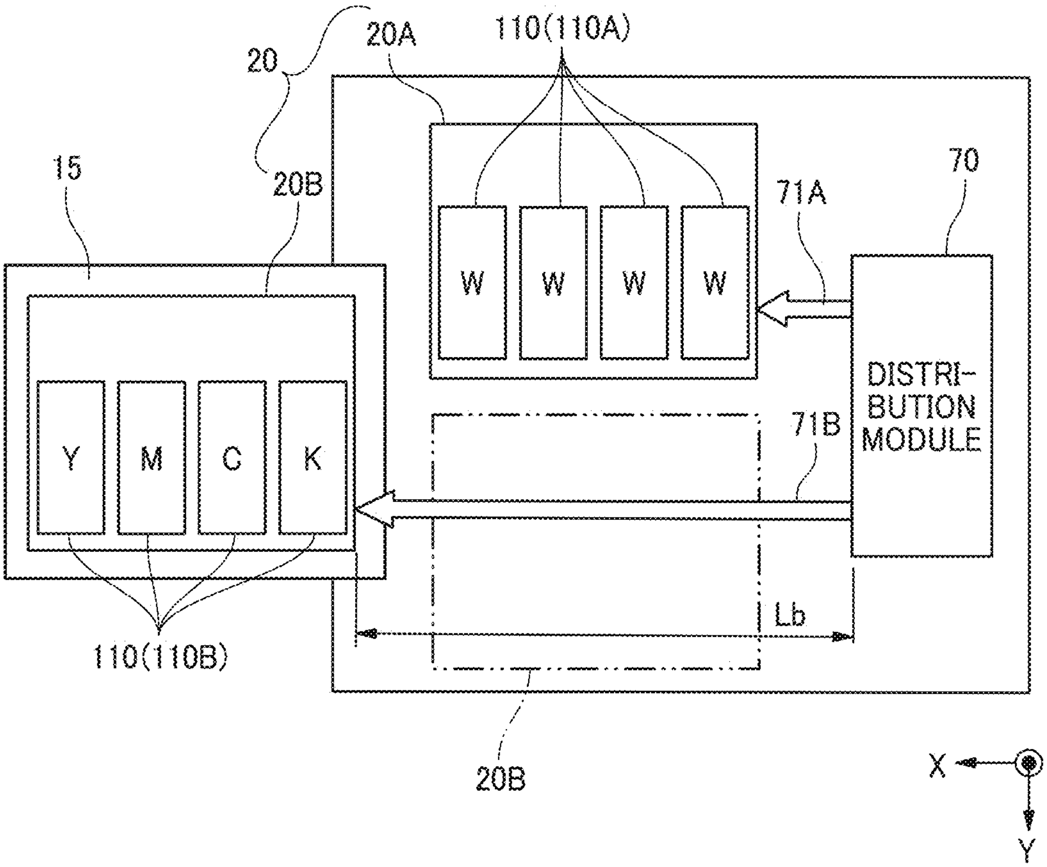
FIG. 8 is a plan view similar to FIG. 7, for describing comparative example 1.

Comparative Example 1 is described below with reference to FIG. 8. FIG. 8 is a plan view similar to FIG. 7 for describing comparative example 1.

In comparative example 1, the branching module 70 (or distribution module in FIG. 8) is located on the opposite side of the sub-carriage 20 relative to the temporary stand 15 in the main scanning direction X, which is the moving direction of the carriage 10.

The interval Lb, or the distance, is provided between the branching module 70 and the second sub-carriage 20B on the temporary stand 15. In other words, the liquid path 71B, which connects the branching module 70 to the second sub-carriage 20B, has a straight-line length of Lb (Lb>La).

In the first embodiment, the needed lengths of the liquid paths 71 (71A and 71B) connecting the sub-carriage 20 to the branching module 70 are shorter than those in comparative example 1. The length of the liquid path is reduced. This enables a reduction in the possibility of sedimentation within the liquid paths between the branching mechanism (or the branch) and the heads when using liquids with sedimentation properties, such as white ink.

When the layout involves different lengths for the liquid paths, between the liquid path 71A for white ink and the liquid path 71B for color ink, the branching module 70 and the temporary stand 15 are positioned to ensure that the liquid path 71A for white ink is shorter than the liquid path 71B for color ink.

This allows for even a slight reduction in the sedimentation of white ink.

Figure 9:
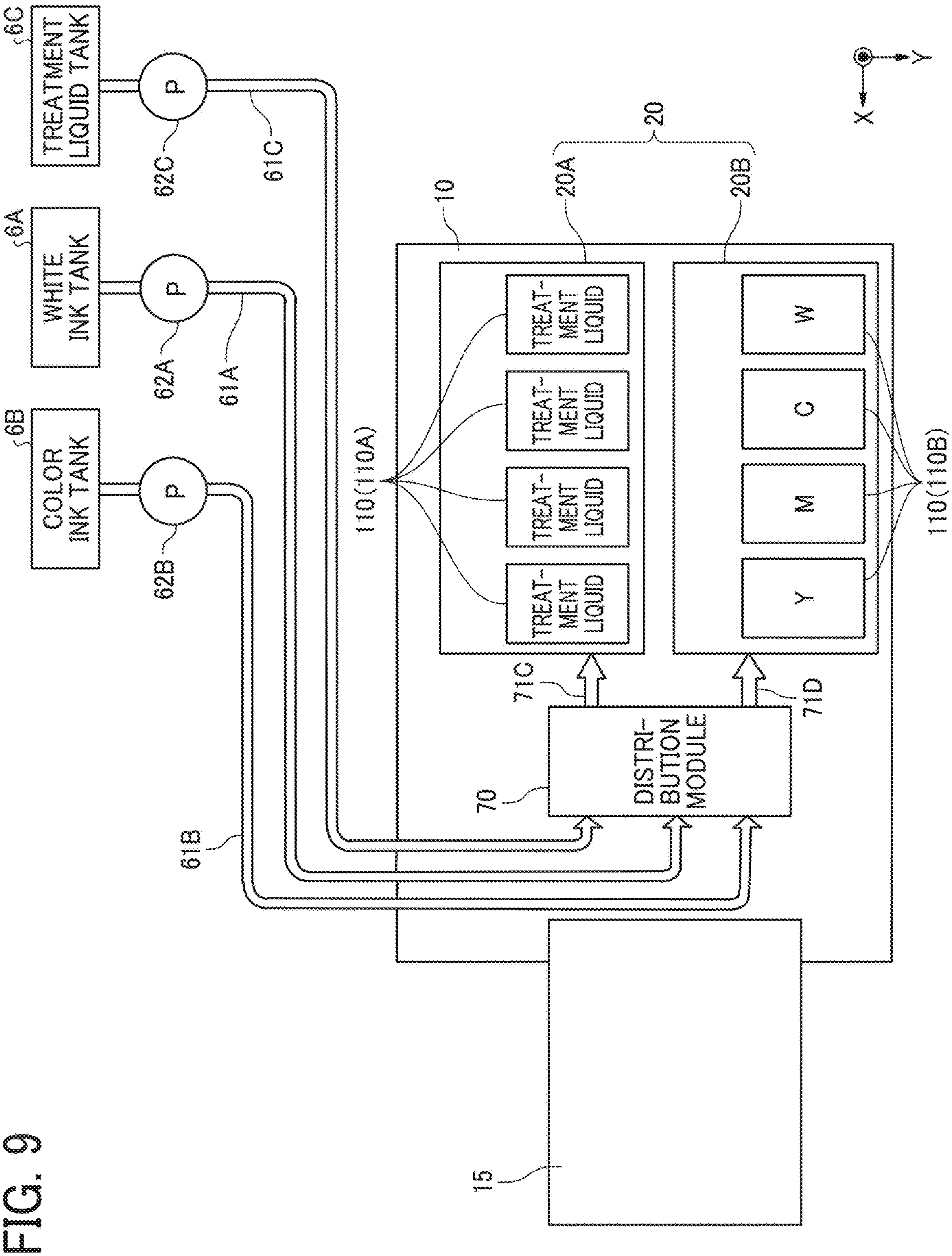
FIG. 9 is a diagram of a liquid supply system according to a second embodiment of the present disclosure.

A second embodiment of the present disclosure is described below with reference to FIG. 9. FIG. 9 is a diagram of a liquid supply system according to the second embodiment of the present disclosure.

In the present embodiment, the first head 110A on the first sub-carriage 20A discharges treatment liquid, and the second head 110B on the second sub-carriage 20B discharges white ink and YMC color inks.

A treatment liquid tank 6C is a liquid tank that contains a treatment liquid supplied to each of the heads 110 of the first heads 110A. The treatment liquid tank 6C is connected to a branching module 70 (or a distribution module in FIG. 9), which is a branching mechanism (or the branch) installed on the carriage 10, through the liquid path 61C. A liquid feed pump 62C, which is a liquid feeder, is disposed in the liquid path 61C.

The white ink tank 6A is a liquid tank that contains white ink supplied to the heads 110 for white ink of the second head 110B. The white ink tank 6A is connected to a branching module 70 (or a distribution module in FIG. 9), which is a branching mechanism installed on the carriage 10, through the liquid path 61A. A liquid feed pump 62A, which is a liquid feeder, is disposed in the liquid path 61A.

The color ink tank 6A is a liquid tank that contains YMC color inks supplied to each of the heads 110 of the second heads 110B. The color ink tank 6B is connected to the branching module 70, which is a branching mechanism or a branch installed on the carriage 10, through a liquid path 61B. A liquid feed pump 62B, which is a liquid feeder, is disposed in the liquid path 61B.

The branching module 70 supplies treatment liquid to each of the first heads 110A on the first sub-carriage 20A through the liquid path 71C. The branching module 70 supplies white ink to the head for white ink of the second heads 110B on the second sub-carriage 20B through the liquid path 71A. The branching module 70 supplies the YMC color inks to the heads 110 of the second heads 110B on the second sub-carriage 20B through the liquid path 71B. The liquid paths 71A, 71B, and 71C are formed of, for example, a flexible tube.

In the present embodiment as well, the branching module 70 is positioned on the same side as the temporary stand 15, relative to the sub-carriage 20 (the first sub-carriage 20A and the second sub-carriage 20B), in the main scanning direction X, which is the moving direction of the carriage 10. In other words, the branch and the temporary stand are disposed at the first side (the left side in FIG. 9) of the carriage in the moving direction, and the sub-carriage is disposed at the second side (the right side in FIG. 9) opposite to the first side of the carriage in the moving direction. When the second sub-carriage is placed on the temporary stand, the second branch path is shorter than the first branch path.

This arrangement allows for shorter liquid paths 71 connecting the branching module 70 to the sub-carriage 20 irrespective of temporary placement of the sub-carriage 20 on the temporary stand 15.

As illustrated in FIG. 7, the multiple heads 110 include: a first head 110A to discharge white liquid; and a second head 110B to discharge color liquid, the sub-carriage 20 includes: a first sub-carriage 20A mounting the first head 110A; and a second sub-carriage 20B mounting the second head 110B. The multiple branch paths 71 have: a first branch path 71A between the branch 70 and the first sub-carriage 20A; and a second branch path 71B between the branch 70 and the second sub-carriage 20B.

Figure 10:
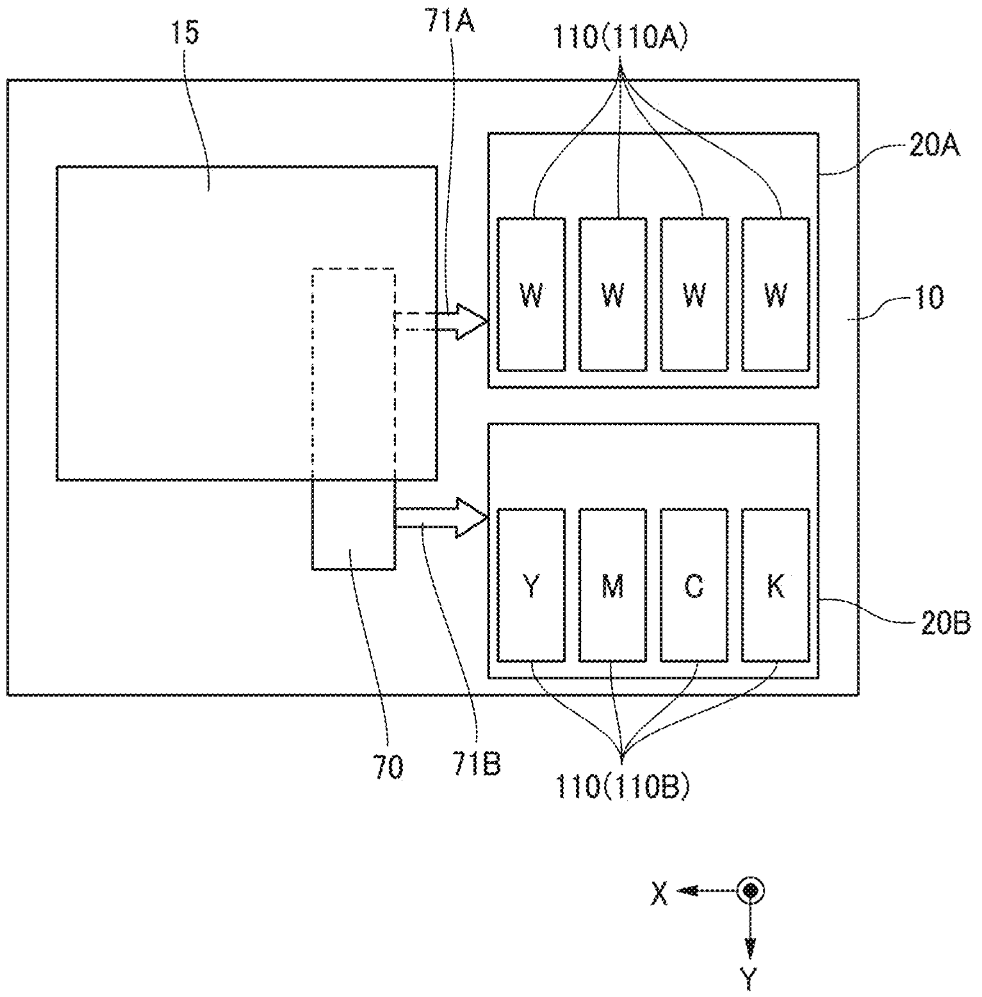
FIG. 10 is a plan view of a carriage according to a third embodiment of the present disclosure.

The third embodiment of the present disclosure is described below with reference to FIG. 10. FIG. 10 is a front view of the carriage according to the third embodiment.

In the present embodiment, the temporary stand 15 is disposed in the carriage 10, on the side of the printer body allocated for maintenance. The temporary stand 15 is installed above the branching module 70 in the vertical direction.

Placing the temporary stand 15 inside the carriage 10 allows for an even shorter liquid path 71 than in the first embodiment.

Figure 11:
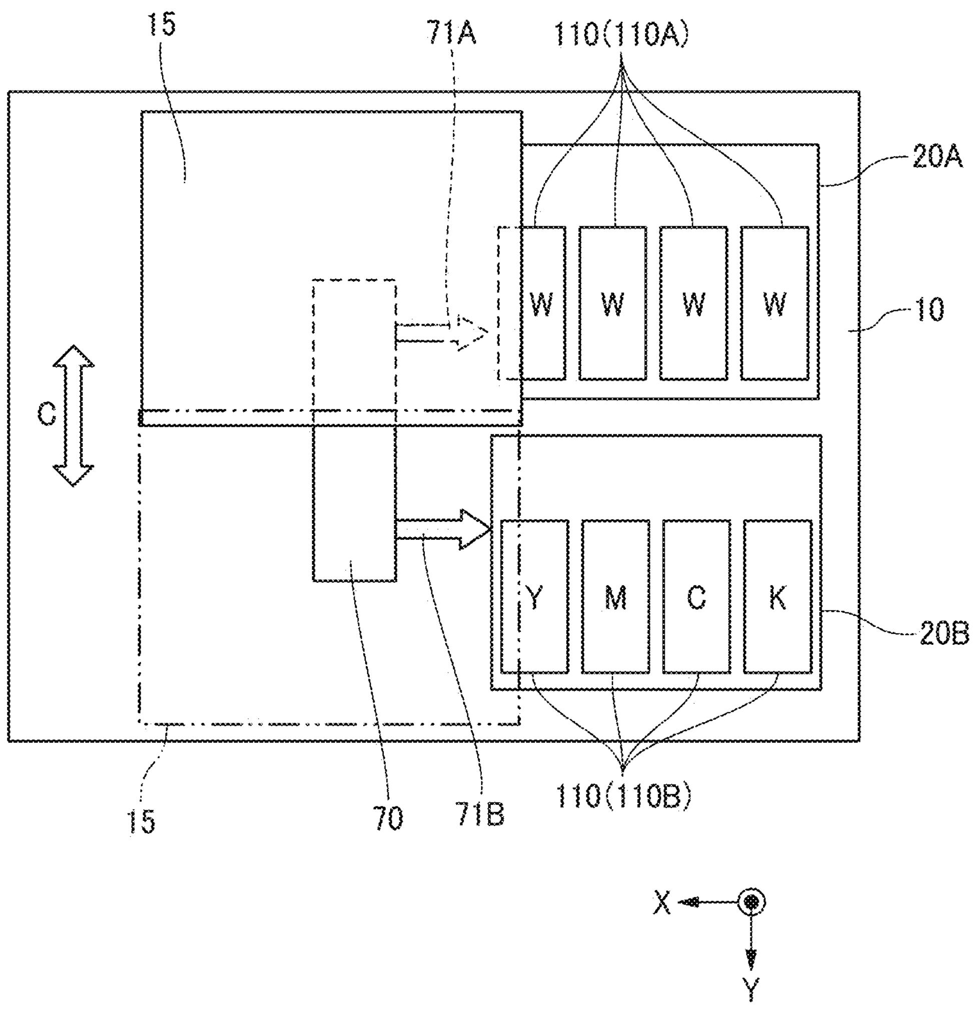
FIG. 11 is a plan view of a carriage according to a fourth embodiment of the present disclosure.

The waste liquid tube 103 according to a fourth embodiment of the present disclosure is described with reference to FIG. 11. FIG. 11 is a plan view of a carriage according to the fourth embodiment.

In the present embodiment, the temporary stand 15 is positioned inside the carriage 10 and can slide in the direction indicated by arrow C, which is within the plane of the XY direction (or a in-plane direction). In other words, the temporary stand 15 is slidable along a plane of the carriage on which the sub-carriage is place.

For the maintenance of the second sub-carriage 20B, the temporary stand 15 is moved toward the first sub-carriage 20A, and for the maintenance of the first sub-carriage 20A, the temporary stand 15 is moved toward the second sub-carriage 20B.

This allows for a smaller carriage size without sacrificing usability.

The waste liquid tube 103 according to a fourth embodiment of the present disclosure is described with reference to FIG. 12. FIG. 12 is a front view of the carriage according to the fifth embodiment.

In the present embodiment, the temporary stand 15 is housed within the carriage 10, allowing the temporary stand 15 to be retractable within the carriage 10. In other words, the temporary stand is movable inside the carriage between a set position to place the sub-carriage on the temporary stand; and a retracted position at which the temporary stand is housed inside the carriage.

The temporary stand 15 is rotatably supported by a support shaft 16 and is movable in the vertical direction with respect to the carriage 10.

Figure 12A:
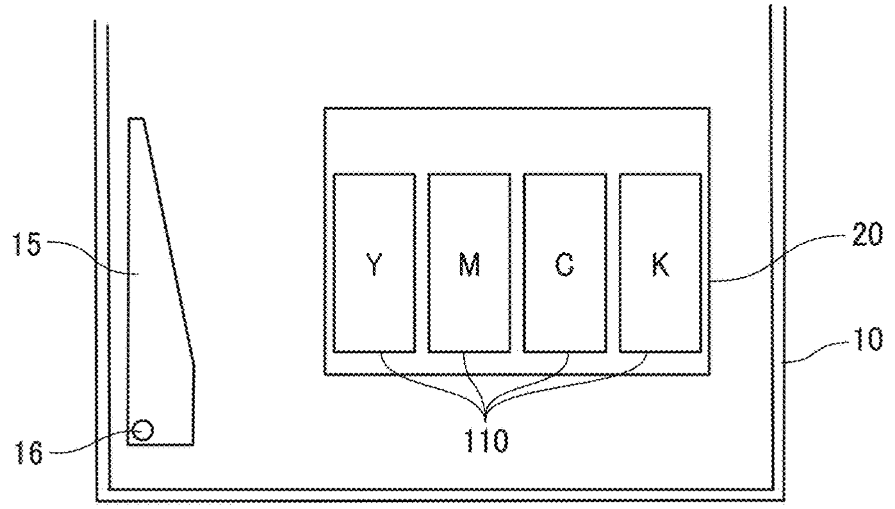
FIGS. 12A and 12B are front views of a carriage according to a fifth embodiment of the present disclosure.
Figure 12B:
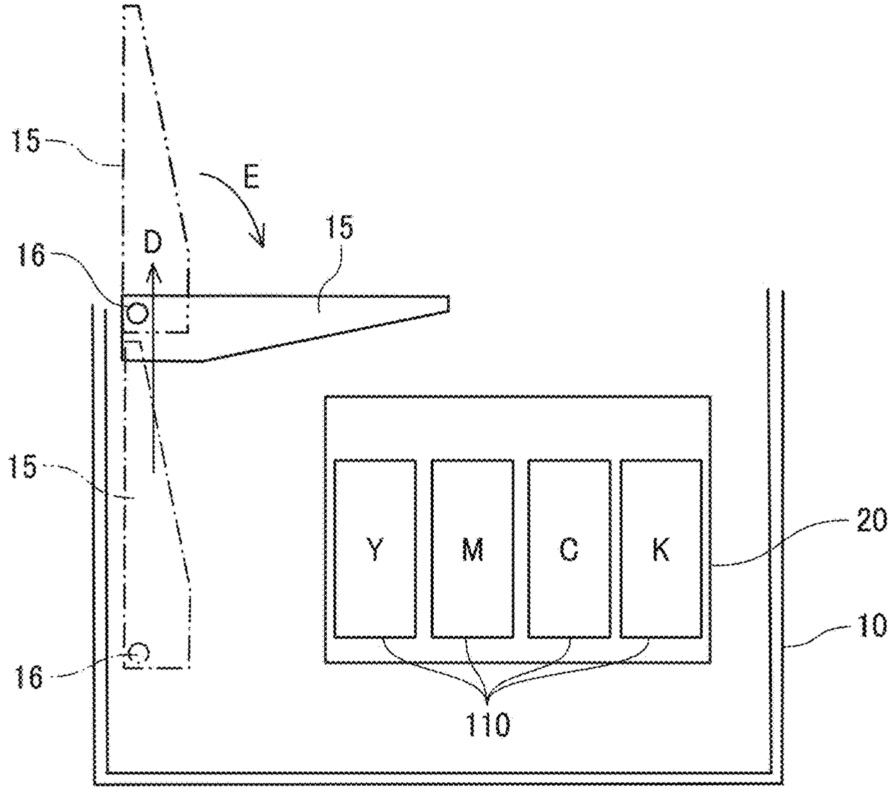

When not in use, the temporary stand 15 is housed within the carriage 10 as illustrated in FIG. 12A. For use, the temporary stand 15 is lifted in a direction indicated by arrow D and then tilted in a direction indicated by arrow E, positioning it outside the carriage 10 as illustrated in FIG. 12B.

The temporary stand 15 is used only during maintenance and can be housed within the carriage 10 during normal printing operation, allowing for a reduction in the overall size of the carriage.

Figure 13:
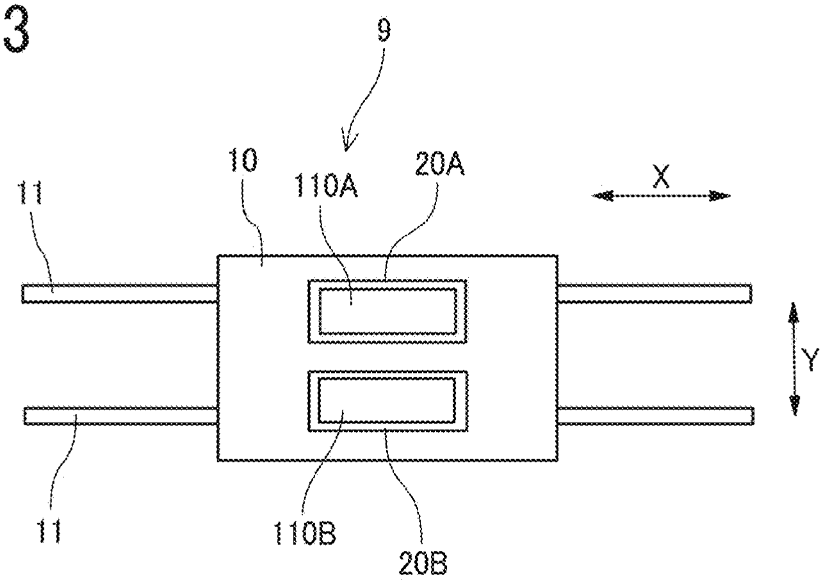
FIG. 13 is a plan view of a carriage as viewed from nozzle faces of heads according to a sixth embodiment of the present disclosure.

The waste liquid tube 103 according to a fourth embodiment of the present disclosure is described with reference to FIG. 13. FIG. 13 is a plan view of the carriage in the embodiment, as viewed from the nozzle surface side of the head.

In the present embodiment, a carriage 10 includes a first head 110A, mounted on the first sub-carriage 20A, that discharges a first liquid, and a second head 110B, mounted on the second sub-carriage 20B, that discharges a second liquid.

The first head 110A and the second head 110B have the longitudinal directions in a direction extending in the main scanning direction X. In this case, for example, the second head 110B discharges a white liquid or a color liquid, and the first head 110A discharges a pretreatment liquid. Alternatively, similarly to the first embodiment, the first head 110A discharges a white liquid, and the second head 110B discharges a color liquid.

Figure 14:
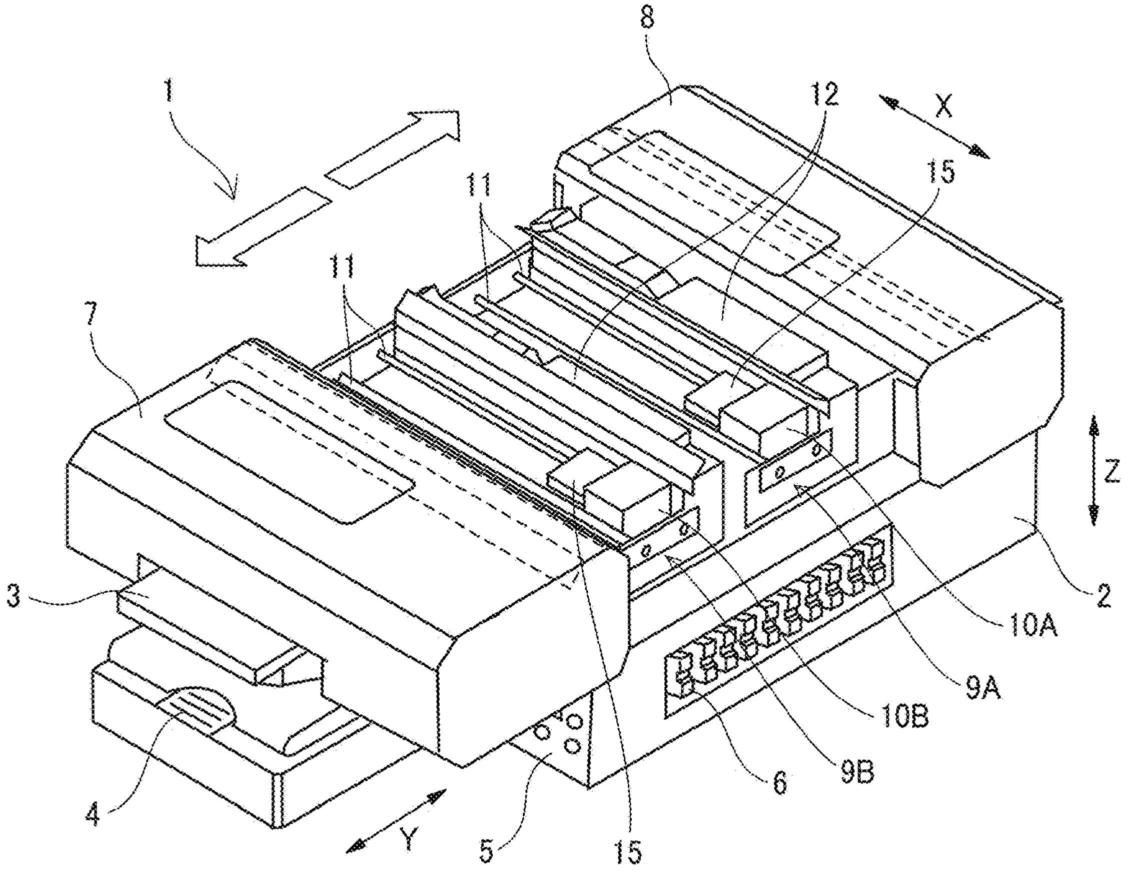
FIG. 14 is a perspective view of a printer according to a seventh embodiment of the present disclosure with each cover open.
Figure 15:
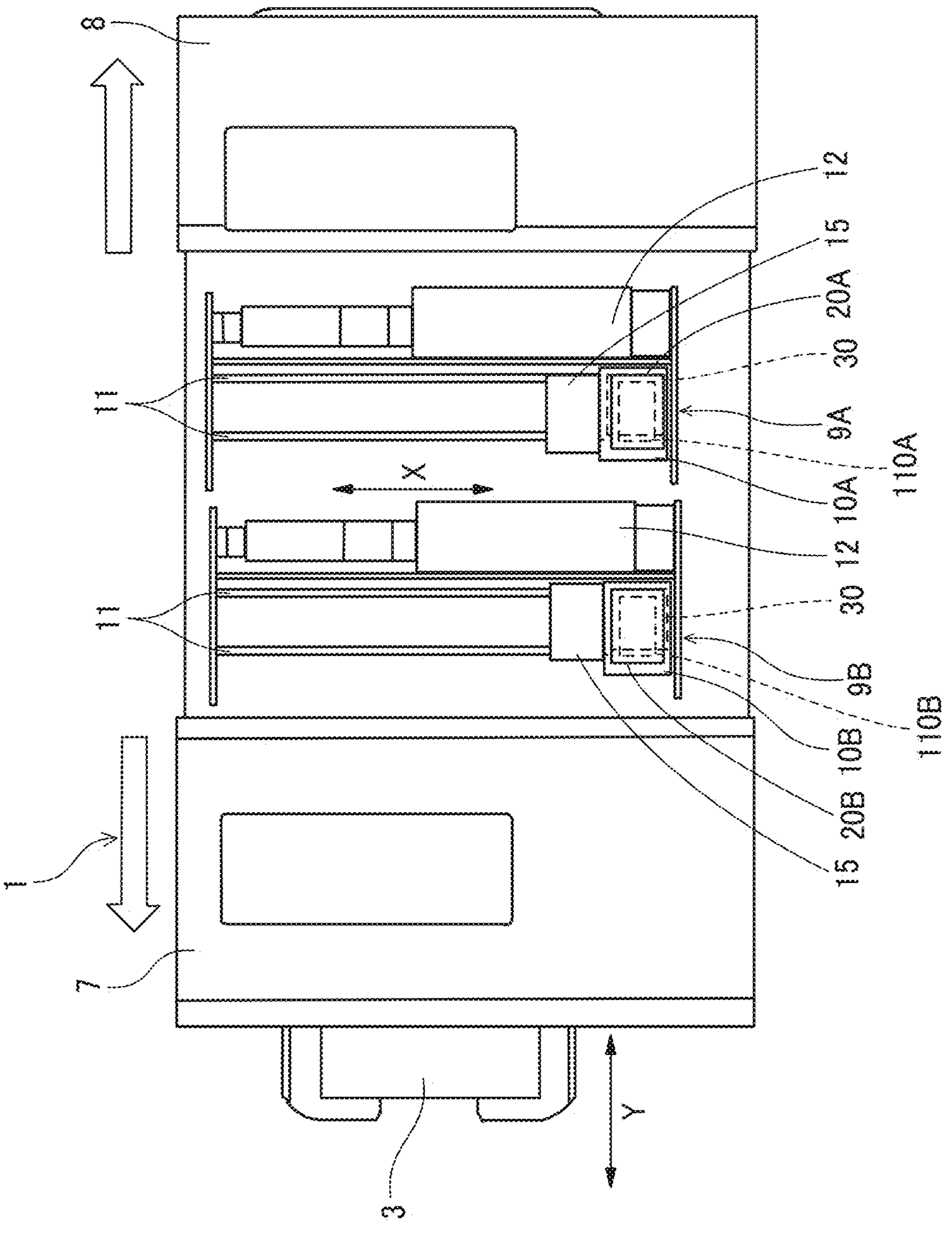
FIG. 15 is a plan view of the printer of FIG. 14 with the covers open.
Figure 16:
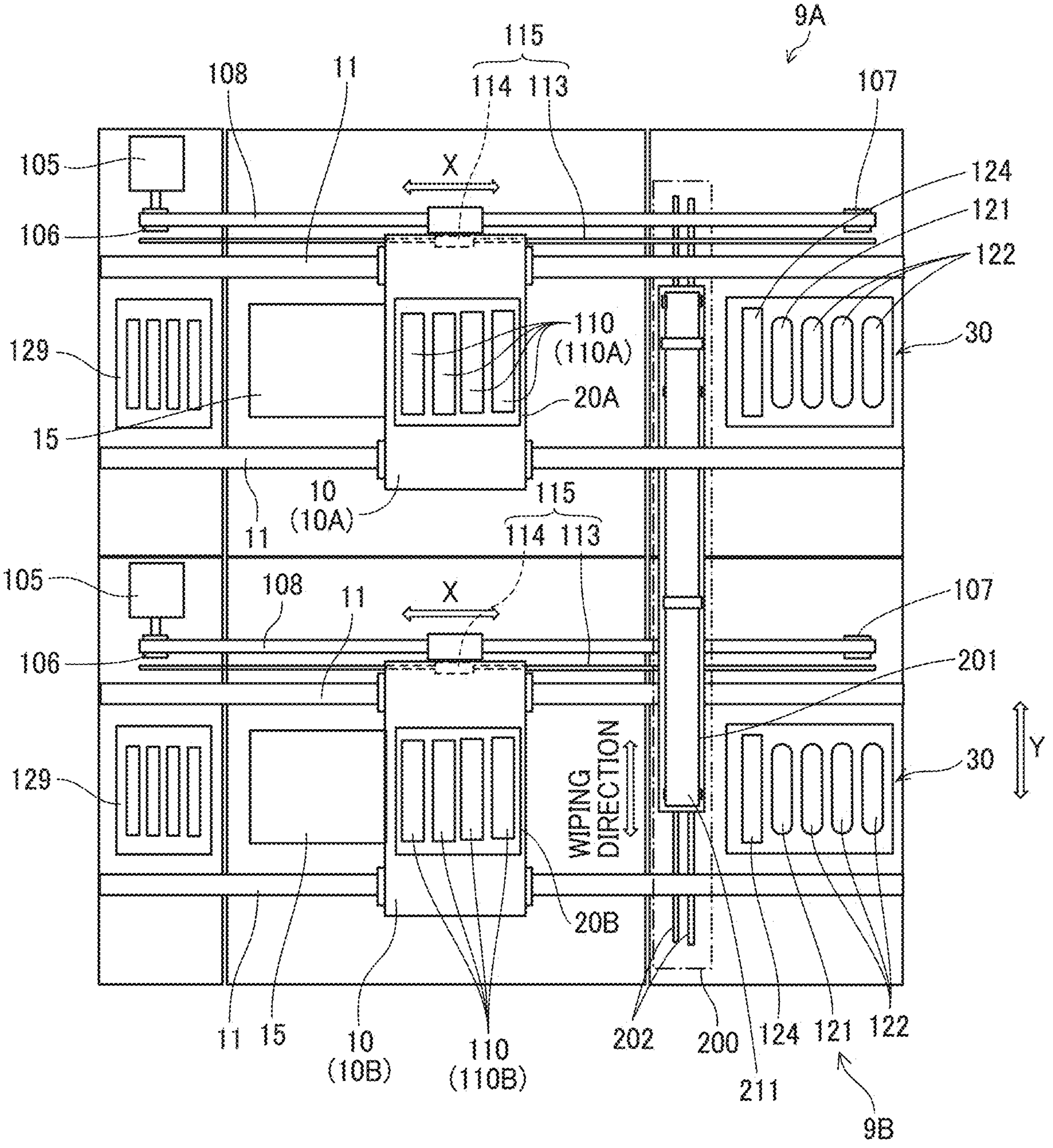
FIG. 16 is a plan view of liquid discharge units included in the printer in FIG. 14.

The seventh embodiment of the present disclosure is described below with reference to FIGS. 14 to 16. FIG. 14 is a perspective view of a printer according to the seventh embodiment with its covers open. FIG. 15 is a plan view of the printer in FIG. 14. FIG. 16 is a plan view of liquid discharge units included in the printer of FIG. 14.

In the present embodiment, liquid discharge units 9A and 9B include first and second carriages 10A and 10B, which are movable in the direction X along the guide rod 11. The first carriage 10A is detachably mounted with a first sub-carriage 20A, which includes a first head 110A. The second carriage 10B is detachably mounted with a second sub-carriage 20B, which includes a second head 110B.

The first carriage 10A includes a temporary stand 15 for temporarily holding the first sub-carriage 20A when detached from the first carriage 10A for the maintenance or replacement of the first head 110A. The second carriage 10B includes a temporary stand 15 for temporarily holding the second sub-carriage 20B when detached from the second carriage 10B for the maintenance or replacement of the second head 110B.

Other configurations of the printer according to the seventh embodiment are identical to those of the printer according to the first embodiment as described above, and thus their explanation is omitted.

The above-described embodiments can be combined with each other within an allowable range.

In any of the embodiments of the disclosure, the liquid to be discharged is not limited to a particular liquid as long as the liquid has a viscosity or surface tension to be discharged from a head (liquid discharge head). However, preferably, the viscosity of the liquid is not greater than 30 mPa·s under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. Such a solution, a suspension, or an emulsion can be used for, e.g., an inkjet ink; a surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and a counter electrode.

The term "liquid discharge apparatus" used herein represents an apparatus including the liquid discharge head to drive the liquid discharge head to discharge liquid. The liquid discharge apparatus may be, for example, an apparatus capable of discharging a liquid to a material to which liquid can adhere or an apparatus to discharge liquid toward gas or into liquid.

The liquid discharge apparatus may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which a powder material is formed in a layer to form a three-dimensional fabrication object.

The "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The "liquid discharge apparatus" may be an apparatus to relatively move the liquid discharge head and a material onto which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particles of the raw material.

Aspects of the disclosure are, for example, as follows.

Aspect 1

A printer includes multiple heads to discharge liquids; a sub-carriage mounting the multiple heads; a carriage movable in a moving direction and detachably mounting the sub-carriage; a liquid container containing the liquids supplied to the multiple heads; a temporary stand on the carriage to temporarily hold the sub-carriage; and a branch having multiple branch paths to distribute the liquids from the liquid container to the multiple heads. The branch and the temporary stand are disposed at a first side of the carriage in the moving direction. The sub-carriage is disposed at a second side opposite to the first side of the carriage in the moving direction.

Aspect 2

In the printer according to Aspect 1, the temporary stand is disposed in the carriage.

Aspect 3

In the printer according to Aspect 1, the temporary stand is slidable along a plane of the carriage on which the sub-carriage is placed.

Aspect 4

In the printer according to Aspect 1, the temporary stand is retractably housed within the carriage. In other words, the temporary stand is movable inside the carriage between: a set position to place the sub-carriage on the temporary stand; and a retracted position at which the temporary stand is housed inside the carriage.

Aspect 5

In the printer according to Aspect 1, the multiple heads include: a first head to discharge white liquid; and a second head to discharge color liquid. The sub-carriage includes a first sub-carriage mounting the first head; and a second sub-carriage mounting the second head. The multiple branch paths have a first branch path between the branch and the first sub-carriage and a second branch path between the branch and the second sub-carriage. When the second sub-carriage is placed on the temporary stand, the second branch path is shorter than the first branch path.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A printer comprising:

multiple heads to discharge liquids;

a sub-carriage mounting the multiple heads;

a carriage movable in a moving direction and detachably mounting the sub-carriage;

a liquid container containing the liquids supplied to the multiple heads;

a temporary stand on the carriage to temporarily hold the sub-carriage; and a branch having multiple branch paths to distribute the liquids from the liquid container to the multiple heads, wherein the branch and the temporary stand are disposed at a first side of the carriage in the moving direction, and the sub-carriage is disposed at a second side opposite to the first side of the carriage in the moving direction.

2. The printer according to claim 1, wherein the branch is between the temporary stand and the carriage in the moving direction.

3. The printer according to claim 1, wherein the temporary stand is disposed inside the carriage.

4. The printer according to claim 1, wherein the temporary stand is slidable along a plane of the carriage on which the sub-carriage is placed.

5. The printer according to claim 1, wherein the temporary stand is movable inside the carriage between:

a set position to place the sub-carriage on the temporary stand; and a retracted position at which the temporary stand is housed inside the carriage.

6. The printer according to claim 1, wherein the multiple heads include:

a first head to discharge white liquid; and a second head to discharge color liquid, the sub-carriage includes:

a first sub-carriage mounting the first head; and a second sub-carriage mounting the second head, wherein the multiple branch paths have:

a first branch path between the branch and the first sub-carriage; and a second branch path between the branch and the second sub-carriage, and when the second sub-carriage is placed on the temporary stand, the second branch path is shorter than the first branch path.

* * * * *